Figure 1:
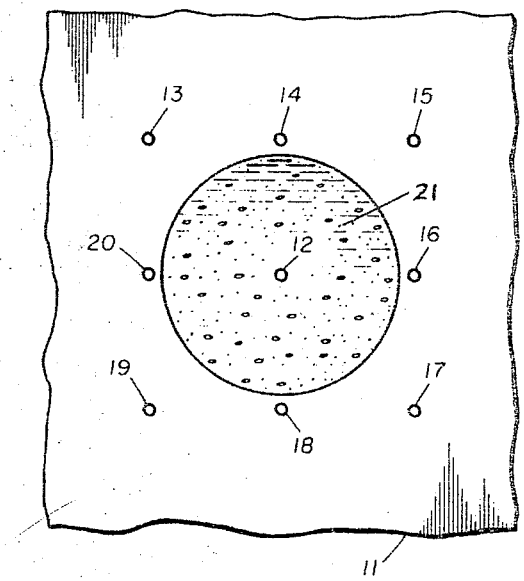

Feb. 7, 1967  M. L. SLUSSER ETAL  3,302,707
METHOD FOR IMPROVING FLUID RECOVERIES FROM EARTHEN FORMATIONS
Filed Sept. 30, 1964

MARION L. SLUSSER
CARL CONNALLY, JR.
INVENTORS

BY Emil J. Bednar

ATTORNEY

United States Patent Office 3,302,707
Patented Feb. 7, 1967

3,302,707
METHOD FOR IMPROVING FLUID RECOVERIES FROM EARTHEN FORMATIONS
Marion L. Slusser, Arlington, and Carl Connally, Jr., Dallas, Tex., assignors to Mobil Oil Corporation, a corporation of New York
Filed Sept. 30, 1964, Ser. No. 400,481
9 Claims. (Cl. 166—4)

This invention relates to a method for improving the recovery of fluids from a subterranean formation containing valuable materials, and more particularly, it relates to the in situ placement of a barrier to confine fluid flows within a certain region in such formation.

Vast amounts of hydrocarbon materials, in various immobile states, are contained in subterranean formations or deposits. The hydrocarbon materials may exist in a solid state, such as the kerogen in oil shale, or in an immobile but fluid state, such as the tarlike materials found in the Athabasca tar sands. These hydrocarbon materials, as a result of their immobile states require no stratigraphic traps, or the like, in the host deposit to collect the hydrocarbon materials or to prevent their migration through openings available for fluid flow. The immobile states of the hydrocarbon materials require treatment to improve their mobility or their conversion into fluid products capable of flowing relatively freely before their recovery can be effected in situ. However, once they are mobilized as flowing fluids, the absence of geological structures to confine the fluidized hydrocarbons to any immediate area of operation in the subterranean deposit creates difficulties in their recovery.

An example of such deposits containing immobile hydrocarbon materials is the vast oil shale formations which exist in several parts of the world. A careful evaluation of these deposits clearly shows that they are interlaced with a multiplicity of interconnected openings available for fluid flows including fractures, fissures, and other types of openings formed by geological and other processes. These openings are both an asset and a liability in the recovery of hydrocarbons from such deposits.

It is well known that the kerogen in oil shale can be converted to mobile liquids and gaseous hydrocarbons by the application of heat. For this purpose, wells can be provided into the oil shale deposit for introducing fluids to effect the necessary heating of the formation for converting the kerogen into fluid hydrocarbons. Various heating fluids, and modes of their application to the oil shale, are known to those skilled in the art. The nature of the oil shale, particularly its negligible permeability to fluids and its extremely low heat conductivity, limits all fluid flows through the openings previously described. Only after the oil shale is freed of its kerogen content does its permeability increase to a value sufficient to permit a usable fluid flow in other than the mentioned openings. However, because the wells are inherently in fluid communication with openings other than those providing communication between adjacent wells, severe losses of the heating fluid and also the resultant fluid hydrocarbons can occur. Thus, under the best conventional circumstances, the amount of fluid hydrocarbons recovered after the in situ conversion of kerogen in the oil shale is a small fraction of what is produced. Additionally, the wells used for the production of such fluid hydrocarbons cannot be employed most effectively as pressure sinks since any increase in well back pressures will increase the amount of fluids lost through the mentioned openings to the oil shale deposit beyond the area from which their recovery can be effected. These problems likewise plague the recovery of hydrocarbons from other types of similar subterranean deposits.

It has been proposed in subterranean deposits containing openings of the described character to employ a plurality of surrounding wells through which is introduced a grout, or the like, to seal the openings about the area in the deposit in which it is desired to confine fluid flow. However, such effort is not altogether successful. Also, these wells generally are sealed with the grout. Thus, these wells at a later time cannot be used for carrying out subsequent in situ procedures to convert the hydrocarbon materials and to recover the resulting fluid hydrocarbons.

This invention is a method for the in situ placement of a barrier to fluid flows in openings in subterranean deposits to confine the fluid flows within an immediate area of operation. The placement of such barrier is obtained by employing wells through which a barrier-forming fluid is introduced into such openings in which the barrier is to be positioned along with other steps to maintain fluid communication between these wells. It will be apparent that, as a result of the continuing fluid communication between these wells, such wells may be employed in subsequent procedures for the recovery of fluids produced by the in situ treatment or conversion of the immobile materials in the subterranean deposits into flowing fluids.

It is therefore an object of the present invention to provide a method for improving the recovery of fluids from subterranean deposits containing openings of the described character. Another object is to provide for the in situ placement of a barrier to fluid flow in openings in such deposits. Yet another object is to provide for the in situ placement of a barrier to fluid flow in openings in such deposit to restrict fluid flows to within an immediate area of operations. Another object is to provide for the placement of a barrier to fluid flows in accordance with the preceding objects employing a plurality of wells, which wells may be subsequently used for conveying fluids between the earth's surface and the openings in the subterranean deposits. A further object is to place a barrier to fluid flows in openings in the mentioned deposits that is adapted to maintain itself at elevated pressures which may be utilized for in situ converting or treating immobile hydrocarbon materials in the deposits into flowing-fluid hydrocarbons whereby wells producing fluids can be operated as pressure sinks. These and other objects will be apparent when read in conjunction with the following detailed description of this invention, when viewed in reference to the attached drawings, and when taken in consideration with the appended claims.

In the drawings are shown portions of a subterranean deposit of oil shale, in horizontal section, illustrating the practice of the method of this invention. In particular, in FIGURES 1 and 2 the oil shale deposit is shown during the initial and final steps, respectively, for providing an annular barrier to fluid flow of one embodiment of this method, and in FIGURES 3, 4, and 5 the oil shale deposit is shown at various stages during the practice of another embodiment of this method for providing an aligned barrier to fluid flow.

Referring to the drawings for assistant orientation, a detailed description of a first embodiment of the method of this invention will be given. In FIGURE 1 is displayed a portion of an oil shale 11, illustrative of a subterranean deposit containing hydrocarbon materials, which is provided as the first step in this method, with a plurality of spaced-apart wells 12 to 20. These wells may be completed in the usual fashion with casings, and cement behind the casings, to a desired depth below the earth's surface. Preferably, fluid flows between the oil shale 11 and each of the wells are restricted to the depth interval from which hydrocarbon fluids are to be recovered. The wells 12 to 20 are, of course, placed in fluid communication with openings in the oil shale 11 over the mentioned interval by any suitable means. These openings found distributed in the oil shale 11, although not shown for convenience in view of their multiplicity and small sizes, usually include interconnected fractures, fissures, and other types of openings, including openings produced by fracturing through natural, hydraulic or other applicable means. The wells 12 to 20 are interconnected with one another through communicating openings, and also interconnected with openings in the oil shale 11 beyond the immediate area of operation penetrated by these wells. It is these latter openings through which fluids are unrecoverably lost.

The wells 12 to 20 are distributed over that immediate area of operation, or portion, of the deposit from which fluid hydrocarbons are desired to be recovered. For the present, it is assumed that barriers to fluid flow are present in the oil shale 11 at the vertical extremities (top and bottom) of such portion. The wells 12 to 20 are placed in a square geometric pattern and the well 12 will be hereinafter referred to for descriptive purposes as central well 12. It will be apparent that other patterns of wells may be utilized. Also, additional wells may be provided to cover the desired portion of the oil shale 11 in regular or irregular patterns. The wells 12 to 20 are connected to suitable equipment (not shown) for moving fluids between the earth's surface and the oil shale 11.

As the next step in this embodiment, a barrier-forming fluid is introduced into the openings in the oil shale through the central well 12. More particularly, such fluid, designated by the numeral 21, is employed in a quantity sufficient to provide a continuous circumferential barrier 22 of a desired areal extent about the central well 12 when disposed in its ultimate position at a desired spacing about such well. With momentary reference to FIGURE 2, it will be seen that the desired barrier 22 encircles the wells 13 to 20 in its ultimate position. From the characteristics of the openings in the oil shale 11, particularly through knowledge of the fluid flow character, both as to directivities and quantities, the amount of the barrier-forming fluid to produce the barrier 22 can be readily determined by those skilled in the art. Returning to FIGURE 1, the barrier-forming fluid 21 and the barrier 22 are shown as unitary bodies. However, in practical applications both barrier and fluid will be distributed in the openings of the oil shale 11 with intervening solid portions of the deposit into which fluids usually cannot penetrate.

The barrier-forming fluid 21 may be comprised of any material which can be introduced in a fluid state into the openings in the oil shale 11, and then after a suitable interval convert into a rigid or semirigid condition or state to form therein a barrier to fluid flows. Examples of suitable barrier-forming fluids are substances such as clay cement slurries, Portland cement slurries, time-setting plastics, sodium silicate with formamide added, and various aqueous gels. However, it is to be understood that other substances having the barrier-forming characteristics of these mentioned substances may be utilized. Additionally, the barrier-forming fluid may be made up of one or more compatible substances and mixtures thereof. Also, the barrier-forming fluid may be varied in the concentration of its active constituents as it is injected, either continuously, or in slugs. Generally, the amount and type of the active constituents in the barrier-forming fluid may be varied to conform with the sizes of the openings within the oil shale 11.

Figure 2:
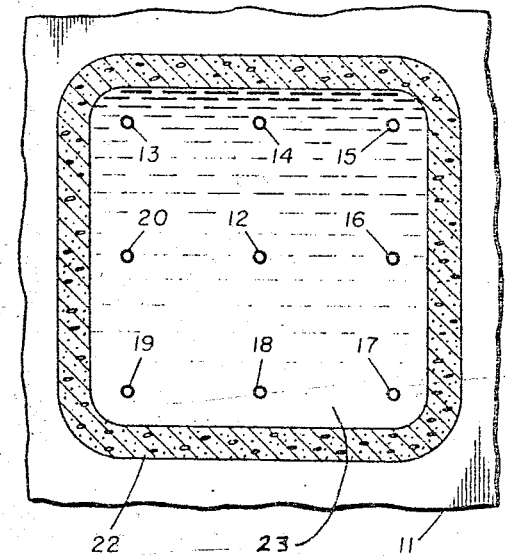

As the next step, to be described in reference to FIGURE 2, a driving fluid is introduced into the openings of the oil shale 11 through the central well 12, for outwardly excluding the barrier-forming fluid 21 through the communicating openings to the wells 13 to 20. The driving fluid, designated by the numeral 23, may be formed of any suitable material which is capable of excluding the barrier-forming fluid 21 from the communicating openings between the wells 12 to 20 within the oil shale 11.

For example, the driving fluid 23 may be a material characterized by a property which allows efficient displacement, without significant bypassing, of the barrier-forming fluid 21 from the communicating openings between the wells 12 to 20. Also, the driving fluid 23 is of a nature permitting it to be removed later from the oil shale 11, if desired, after the desired encircling barrier 22 is formed within the openings about the wells 13 to 20. For example, the driving fluid 23 may be a material such as water, water with additives to thicken it, weak aqueous gels, air, other gases, and mixtures thereof. The driving fluid 23 may be one material or admixtures of different materials, slugs of the same or different materials introduced continuously or in sequence, and various combinations thereof. Selection of the driving fluid 23 in any specific application in the oil shale 11 for a particular barrier-forming fluid to be excluded from the communicating openings between the central well 12 and the wells 13 to 20 is within the ordinary skill of an artisan in the arts.

As another step in this embodiment, during the introduction of the driving fluid 23 into the central well 12, each of the other wells 13 to 20 is closed to fluid flow except for a monitoring flow suitable to detect the flow therefrom of the driving fluid. Such monitoring flow may be at a rate just sufficient to maintain continued fluid flow from the communicating openings in the oil shale 11 through the wells 13 to 20. Alternatively, it is equally suitable for this purpose to flow fluid from the wells 13 to 20 at a periodic interval. The monitoring flow prevents the barrier-forming fluid from forming a barrier in the communicating openings between the wells 13 to 20. Also, the first flow of the driving fluid 23 from the communicating openings between the wells 13 to 20 is detected after the exclusion from such openings of the barrier-forming fluid. Obviously, only minimal amounts of the barrier-forming fluid are lost by such monitoring flow of fluid from the wells 13 to 20. As is obvious when driving fluid 23 flows from the wells 13 to 20, the barrier forming fluid has moved to substantially its ultimate position for forming the barrier 22.

Another step of this embodiment is taken after detection of the driving fluid flow from each of the wells 13 to 20. At this time, these wells are opened to a fluid flow suitable to circulate the barrier-forming fluid from the communicating openings between the central well 12 and each of the remaining wells 13 to 20. For practical purposes, each of the wells 13 to 20 has been completely closed in until the driving fluid 23 has appeared at all of such wells. Now, with the driving fluid 23 appearing at all of the wells 13 to 20, these wells are opened to a fluid flow suitable to circulate any remaining barrier-forming fluid from the communicating openings between the central well 12 and each of the wells 13 to 20. The fluid flow from these wells, of course, should not be so small as to permit any remaining barrier-forming fluid to convert into a barrier in the communicating opening between the wells 12 to 20. Neither should this flow be such as to create elevated pressures sufficient that the driving fluid will flow outwardly past the ultimate position of the barrier 22.

Preferably, as an optional step, the wells 13 to 20 are opened to fluid flow in normal sequence to the appearance therein of the driving fluid, to facilitate flow of driving fluid 23 from each of the wells and to flush the barrier-forming fluid from the immediate vicinity of each of the wells 13 to 20, until no further barrier-forming fluid is produced with the driving fluid.

Preferably, as another optional step, all of the wells 12 to 20 are closed to fluid flow for a suitable period after the driving fluid 23 has flushed the barrier-forming fluid from the communicating openings between the central well 12 and each of the other wells 13 to 20. This period should extend for the time required for the barrier-forming fluid to form into the barrier 22.

After the formation of the barrier 22, the driving fluid 23 may be removed from the encircled portion of the oil shale 11 containing the wells 12 to 20. In many instances, the driving fluid 23 will be compatible with fluids used in a subsequent procedure employed to produce fluid hydrocarbons in the oil shale 11. Under these conditions, the driving fluid 23 need not be removed from such portion of the oil shale 11. Obviously, the driving fluid 23 can be removed from the portion of the oil shale 11 enclosed by the barrier 22, if desired, by displacement with another fluid.

It will be apparent that by the preceding steps the barrier 22 now encircles the portion of the oil shale 11 which contains the wells 12 to 20 by filling the openings through which fluid losses would occur. Additionally, the wells 12 to 20, and the communicating openings therebetween, encircled by the barrier 22 are open to fluid flow and therefore utilizable for fluid conveyance in subsequent procedures to convert the kerogen in the oil shale 11 into fluid hydrocarbons, and to recover such fluid hydrocarbons. Particularly, any of the wells 12 to 20 may be operated as pressure sinks for the recovery of these fluid hydrocarbons. The advantages of such operation of these wells are apparent.

The oil shale 11 is shown to be enclosed horizontally by the barrier 22. However, it will be apparent that the barrier 22 can be provided along a desired vertical boundary for the enclosure of the oil shale 11 against vertical fluid losses by practice of the preceding steps with suitable wells placed in fluid communication with openings at the proper horizon.

Turning now in reference to the FIGURES 3, 4 and 5, a second embodiment of the present method will be described that provides an aligned barrier along one or more edges of a subterranean deposit containing hydrocarbon materials, such as oil shale 31, which may be large in area. The oil shale 31 is penetrated in a first step of this embodiment by a plurality of spaced-apart wells 32 to 36 arranged in row A, wells 37 to 41 arranged in row B, and wells 42 to 46 arranged in row C. The rows A, B, and C of wells are arranged in a side by side relationship and preferably are made parallel. The mentioned wells may be completed in the usual manner as described in the previous embodiment and are placed in fluid communication with the openings in the oil shale 31. The openings in the oil shale 31 are of the same nature as has been described for the oil shale 11. The particular rectangular geometric well arrangement shown is for illustrative purposes, and other well arrangements can be used, if desired.

Figure 3:
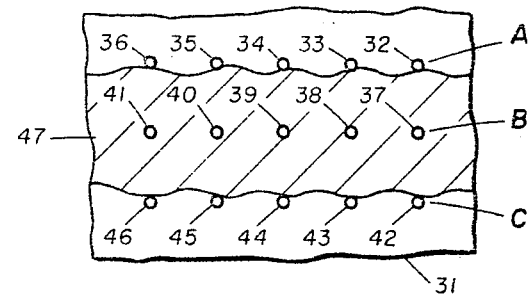

As the next step to be described specifically in reference to FIGURE 3, a temporary barrier-forming fluid is introduced through the wells 37 to 41 in row B into the openings in the oil shale 31. The temporary barrier-forming fluid may be any composition suitable to provide a temporary barrier in the openings, and from which it later may be excluded or removed by circulating therethrough a driving fluid. The temporary barrier-forming fluid is preferably a composition of a weak aqueous gel, or a fluid with thixotropic properties, which when quiescent become sufficiently rigid so as not to drain away from the area about the wells 37 to 41 in row B during the next following step. For example, the temporary barrier-forming fluid may be a drilling mud, preferably one having relatively low yield values.

The temporary barrier-forming fluid is introduced into the wells in row B in a quantity sufficient to provide a temporary barrier 47 in the openings residing between the rows A and C of wells. Generally, the temporary barrier-forming fluid is introduced continuously from each of the wells 37 to 41 in row B until it appears in each of the wells 32 to 36 in row A and 42 to 46 in row C. If desired, the adjacent wells in rows A and B may be closed to fluid flow at the appearance of the mentioned fluid at each of these wells, especially the wells in row A.

Figure 4:
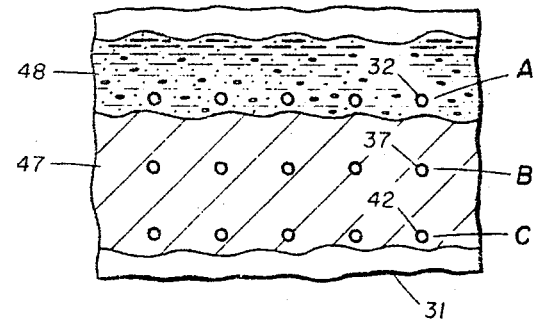

As the next step in this embodiment of the present method, as is shown particularly in FIGURE 4, a barrier-forming fluid is introduced into the openings in the oil shale through the wells 32 to 36 in row A after the formation of the temporary barrier 47. The barrier-forming fluid is introduced in a quantity sufficient to provide a continuous barrier 48 extending longitudinally along the wells 32 to 36 in row A. The barrier-forming fluid may be the same as in the first-described embodiment of this method. Contemporaneously with the introduction of the barrier-forming fluid through the wells in row A, the flow of fluid from the wells in row A toward the wells 37 to 41 in row B is blocked. This result is obtained by regulating the fluid flow of the temporary barrier-forming fluid through the wells 37 to 41 in row B. For example, during the injection of the barrier-forming fluid through the wells in row A, a breakdown of the temporary barrier 47, such as evidenced by a tendency to backflow into the wells 37 to 41 in row B, is blocked by introducing additional temporary barrier-forming fluid into the wells 37 to 41 in row B. The wells in row C may also be used for these purposes, if desired.

Figure 5:
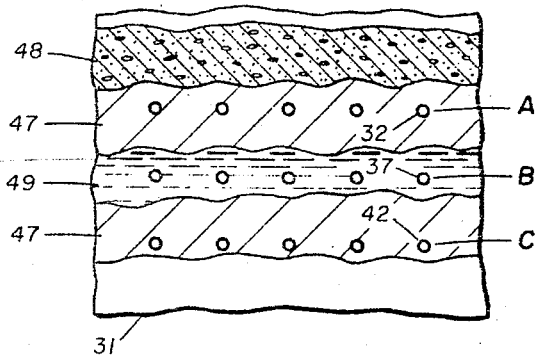

After introduction of the barrier-forming fluid through the wells in row A, another step is practiced with the results shown in FIGURE 5. In this step, a driving fluid for excluding the priorly introduced barrier-forming fluids from the openings in the oil shale 31 between the rows of wells A and C is introduced into openings in the oil shale 31 through the wells 37 to 41 in row B. The driving fluid, designated by numeral 49, displaces the fluids of the temporary barrier 47 outwardly toward the wells in rows A and C. The driving fluid may be the same as in the previously described embodiment of this invention. At this time, the wells 32 to 36 in row A and 42 to 46 in row C are open to fluid flow at a rate not greater than the rate of introduction of the driving fluid through the wells in row B until the fluids of the temporary barrier 47 are displaced from the wells in row A. This fluid flow arrangement insures that the barrier 48 in its ultimate position is spaced from the wells in rows A and B, and that the temporary barrier 47 is displaced in part into that portion of the oil shale 31 previously occupied by barrier-forming fluids which ultimately produce the barrier 48.

After the detection of the fluids of the temporary barrier 47 flowing from the wells of row A, and during introduction of the driving fluid into the wells of row B, another step is practiced. In this step, the wells in rows A and C are opened to a fluid flow suitable to circulate the barrier-forming fluids from the communicating openings between the wells of rows A and C. It will be apparent that the driving fluid circulates the barrier-forming fluids from such openings so that fluid communication between the wells in rows A, B, and C is obtained. Thus, the wells in rows A, B, and C, and the communicating openings therebetween can be used for subsequent processing of the oil shale 31 in the manner indicated in the previous embodiment for the oil shale 11.

Preferably, as an optional step taken after the initial flow of the fluids of the temporary barrier 47 through the wells in row A, a suitable interval is allowed to elapse to permit the formation from the barrier-forming fluid of the barrier 48 in the openings adjacent to but spaced from the wells in row A before continuing the injection of the driving fluid to flush the various barrier-forming fluids from the communicating openings between the wells in rows A, B, and C in the oil shale 31.

Returning to FIGURES 1 and 2, yet another embodiment of the method of this invention will be described. The structures of the oil shale 11, the openings, and the wells 12 to 20 previously described can be used to practice this embodiment. This embodiment is particularly suitable for placing a barrier 22 in the openings in the oil shale 11 by a procedure likened to "squeeze cementing" in oil wells. Preferably, the barrier 22 is placed at pressures sufficiently equal to those later utilized in producing fluid hydrocarbons whereby even hairline sized openings will be filled with the barrier 22 for an appreciable distance into the network of openings surrounding the oil shale 11 of fluids at high pressures will not expand such openings to generate escape routes for the appreciable loss of operational fluids.

The first step of the first-described embodiment of the present method also is utilized in providing the wells 12 to 20 in the oil shale 11 in this embodiment.

Preferably, the next step is the introduction into the openings of the oil shale 11, by means of the central well 12, of a temporary barrier-forming fluid. This fluid is introduced in a quantity sufficient to provide a continuous circumferential barrier to fluid flow about the central well 12 when in its ultimate position. This barrier (not shown) is placed to ring the barrier 22 shown in FIGURE 2. This step should precede the following step for the introduction of the barrier-forming fluid through the central well 12. By this means, the peripheral openings adjacent the barrier 22 about the wells 13 to 20 are sealed by the temporary barrier-forming fluid. Therefore, a later injection of the barrier-forming fluid can be undertaken at a sufficiently elevated pressure without excessive loss of such fluid into the openings in the oil shale 11 beyond the wells 13 to 20. The temporary barrier-forming fluid may be the same as in the previously described embodiment.

The next step is the introduction in accordance with the first-described embodiment of the barrier-forming fluid, designated by the numeral 21, through central well 12 into the openings in the oil shale 11. The barrier-forming fluid displaces any temporary barrier-forming fluid away from the central well 12.

As the next step of this embodiment, the wells 13 to 20 not used for introducing the barrier-forming fluids are closed to fluid flows during the placement of the barrier-forming fluid 21 into the openings of the oil shale 11 except for a monitoring flow of fluid sufficient to maintain fluid flow through the communicating openings between the central well 12 and each of the wells 13 to 20. The barrier-forming fluid may be the same as in the previous embodiments. The pressures at which the barrier-forming fluid is introduced into the central well 12 are increased to the desired level during this step.

As the next step, a driving fluid 23 for excluding the barrier-forming fluid from the communicating openings between the wells is introduced through one of the wells, preferably the central well 12. The driving fluid 23 may be the same as in the previous embodiments.

Another step is the opening of the wells 13 to 20 to a fluid flow regulated at a rate sufficient to circulate the driving fluid 23 through the communicating openings between the central well 12 and the wells 13 to 20. The driving fluid need be circulated only until the barrier-forming fluids are removed from the wells 12 to 20 and the communicating openings therebetween.

It will be apparent that in this last-described embodiment of the present method, a high fluid pressure is possible in the placement of the barrier-forming fluid through the central well 12. By maintaining a small monitoring flow at each of the wells 13 to 20 during this period, the communicating openings between the central well 12 and the wells 13 to 20 remain open even though the barrier-forming fluid may begin to convert into the barrier 22 about the periphery of the wells 13 to 20. If during the introduction of this fluid the monitoring fluid flow between the central wells 12 and any of the wells 13 to 20 ceases, then each such of the wells 13 to 20 is opened sufficiently to re-establish fluid flow. This is of great utility in placing barriers which permit subsequent high-pressure conditions in the operational fluids employed for the in situ conversion of the kerogen in oil shale into fluid hydrocarbons, and also the efficient operation of wells as pressure sinks for producing such fluid hydrocarbons.

From the foregoing it will be apparent that there has been provided several embodiments of a method well suited for satisfying all of the stated objects of this invention. Various changes and alterations may be made in the steps described for this method by those skilled in the art without departing from the spirit of the invention. It is intended that changes and alterations in the described method under these conditions are to be included within the scope of the following appended claims.

What is claimed is:

1. A method for the in situ placement of a barrier to fluid flows in openings in subterranean deposits, comprising the steps of:
   (a) providing a plurality of spaced-apart wells in fluid communication with openings in the deposit,
   (b) introducing into openings in the deposit, via one of said wells, a barrier-forming fluid sufficient in quantity to form a barrier to fluid flow of a desired areal extent when disposed in its ultimate position and introducing into openings in the deposit, via one of said wells, a driving fluid for excluding the barrier-forming fluid from communicating openings between wells,
   (c) closing other of said wells not used for introducing the driving fluid to fluid flows during the introduction of the driving fluid except for a monitoring flow suitable to detect a flow therefrom of said driving fluid, and
   (d) opening the other of said wells after detection of said driving fluid to a flow of said driving fluid suitable to circulate the barrier-forming fluid from the communicating openings and the wells.

2. A method for the in situ placement of a barrier to fluid flows in openings in subterranean deposits, comprising the steps of:
   (a) providing a plurality of spaced-apart wells in fluid communication with openings in the deposit, said wells including a central well,
   (b) introducing into openings in the deposit, via the central well, a barrier-forming fluid sufficient in quantity to provide a continuous circumferential barrier of desired areal extent about the central well when disposed in its ultimate position at a desired spacing about such well,
   (c) introducing into openings in the deposit, via the central well, a driving fluid for outwardly excluding through communicating openings the barrier-forming fluid to other of the wells,
   (d) closing each of the other said wells to fluid flows during the introduction of the driving fluid except for a monitoring flow suitable to detect the flow therefrom of driving fluid, and
   (e) opening the other said wells after detection of said driving fluid therein to a flow of driving fluid suitable to circulate the barrier-forming fluid from the communicating openings and the central well and each of the other wells.

3. The method of claim 2 wherein all of the wells are closed to fluid for a suitable period after the practice of step (e) so that the barrier-forming fluid forms the barrier in the openings of the deposit other than those containing the driving fluid.

4. The method of claim 2 wherein the opening of the wells in step (e) is taken in a normal sequence to the appearance therein of driving fluid as detected in step (d).

5. A method for the in situ placement of a barrier to fluid flows in openings in subterranean deposits, comprising the steps of:
   (a) providing a plurality of spaced-apart wells in fluid communication with openings in the deposit, said wells arranged in several juxtapositioned rows designated in a series for reference purposes as row A, row B, and row C,
   (b) introducing via the wells in row B a temporary barrier-forming fluid into openings in the deposit, said fluid being excludable from such openings by the subsequent circulation therethrough of a driving fluid, and said temporary barrier fluid being introduced in a quantity sufficient to povide a temporary barrier in the openings between rows A and C of wells,
(c) introducing into openings in the deposit, via wells in row A, after formation of a temporary barrier between rows A and B of wells, a barrier-forming fluid in a quantity sufficient to provide a continuous barrier extending along the wells in row A, and contemporaneously, blocking the flow of such fluid from row A toward row B by regulating the fluid flow of the temporary barrier fluid through wells in row B,
(d) introducing into openings in the deposit, via the wells in row B, a driving fluid for excluding the priorly introduced barrier-forming fluids from such openings, and the wells in rows A and C are opened to fluid flow at a rate not greater than the rate of introduction of the driving fluid until the temporary barrier-forming fluid flows from the wells in row A, and
(e) opening the wells in rows A and C after detection of said temporary barrier-forming fluid in the wells of row A to a flow of the driving fluid suitable to circulate the barrier-forming fluids from the communicating openings and the rows A and C of the wells.

6. The method of claim 5 wherein after the step (d) a suitable interval lapses to provide for formation of the barrier in the openings adjacent the wells in row A before practicing step (e).

7. A method for the in situ placement of a barrier to fluid flows in openings in subterranean deposits, comprising the steps of:
(a) providing a plurality of spaced-apart wells in fluid communication with openings in the deposit, said wells including a central well,
(b) introducing into openings in the deposit, via one of the wells, a barrier-forming fluid in sufficient quantity to form a continuous circumferential barrier about the central well when disposed in its ultimate position thereabouts.
(c) closing other of the wells not used for introducing the barrier-forming fluid to fluid flows during its displacement into the openings to insure displacement of said fluid into said openings between the wells, said wells closed except for a monitoring flow sufficient to maintain a fluid flow through communicating openings between the other of the wells and the well wherein the driving fluid is introduced,
(d) introducing into the openings in the deposit, via one of said wells, a driving fluid for excluding the barrier-forming fluid from the communicating openings between the wells, and
(e) opening other of the wells to a fluid flow regulated at a rate sufficient to circulate driving fluid through the communicating openings and the wells.

8. A method for the in situ placement of a barrier to fluid flows in openings in subterranean deposits, comprising the steps of:
(a) providing a plurality of spaced-apart wells in fluid communication with openings in the deposit, said wells including a central well,
(b) introducing into openings in the deposit, via the central well, a quantity of a temporary barrier-forming fluid sufficient to provide a continuous circumferential barrier to fluid flow about the central well when disposed in its ultimate position at a desired spacing about such well, said fluid subsequently being removable from such openings by circulation therethrough of a driving fluid,
(c) introducing into the openings in the deposit, via the central well, a barrier-forming fluid for excluding through communicating openings the temporary barrier-forming fluid to other of the wells,
(d) closing each of the other wells to fluid flow when the first-introduced fluid flows therefrom, and thereafter during the introduction of the barrier-forming fluid except for a monitoring flow sufficient to detect a fluid flow through the communicating openings between the wells of the barrier-forming fluid,
(e) opening the other of said wells after detection of said barrier-forming fluid to a fluid flow regulated at a rate sufficient to maintain circulation of such fluid through the communicating openings from the central well to each of the other of said wells, and
(f) introducing into the openings in the deposit, via the central well, a driving fluid for excluding the barrier-forming fluids from the communicating openings and the central well and the other of said wells after the barrier-forming fluid forms a desired barrier in openings in the deposit other than in the communicating openings and the wells through which circulation of the driving fluid is maintained.

9. The method of claim 8 wherein the barrier-forming fluid introduced in step (c) is under an elevated pressure of substantially the same magnitude as will be encountered in subsequent injections of fluids through the communicating openings in the deposit.

References Cited by the Examiner
UNITED STATES PATENTS

| | | | |
|---|---|---|---|
| 1,198,078 | 9/1916 | Squires | 166—21 |
| 1,870,869 | 8/1932 | Ranney et al. | 299—2 |
| 2,365,039 | 12/1944 | Andresen | 166—29 |
| 2,807,324 | 9/1957 | King et al. | 166—29 |
| 2,976,926 | 3/1961 | Maly | 166—9 |
| 3,084,744 | 4/1963 | Dew et al. | 166—9 |
| 3,141,503 | 7/1964 | Stein | 166—29 |

References Cited by the Applicant
UNITED STATES PATENTS

| | | |
|---|---|---|
| 2,593,477 | 4/1952 | Newman et al. |
| 2,595,979 | 5/1952 | Pevere et al. |
| 2,777,679 | 1/1957 | Ljungstrom. |
| 2,818,240 | 12/1957 | Livingston. |
| 2,969,226 | 1/1961 | Huntington. |

CHARLES E. O'CONNELL, *Primary Examiner.*

S. J. NOVOSAD, *Assistant Examiner.*